(12) United States Patent
Kato

(10) Patent No.: US 6,940,207 B2
(45) Date of Patent: Sep. 6, 2005

(54) MICROMACHINED MOVING DEVICE CONTROLLED BY A VARYING— AMPLITUDE AC DRIVE SIGNAL

(75) Inventor: Yoshichika Kato, Tachikawa (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 132 days.

(21) Appl. No.: 10/627,392

(22) Filed: Jul. 25, 2003

(65) Prior Publication Data

US 2004/0032185 A1 Feb. 19, 2004

(30) Foreign Application Priority Data

Jul. 30, 2002 (JP) ........................................ 2002-221405

(51) Int. Cl.[7] ........................... H02N 1/00; G02B 26/10; G02B 26/08
(52) U.S. Cl. ........................... 310/309; 318/116; 385/18
(58) Field of Search ........................... 310/309; 318/116; 200/181; 385/18

(56) References Cited

U.S. PATENT DOCUMENTS

| 6,140,737 | A | 10/2000 | Boie | 310/309 |
|---|---|---|---|---|
| 6,351,054 | B1 * | 2/2002 | Cabuz et al. | 310/309 |
| 6,608,268 | B1 * | 8/2003 | Goldsmith | 200/181 |
| 2002/0074896 | A1 | 6/2002 | Kasahara | 310/309 |
| 2004/0032185 | A1 * | 2/2004 | Kato | 310/309 |
| 2004/0124073 | A1 * | 7/2004 | Pillans et al. | 200/181 |

FOREIGN PATENT DOCUMENTS

| EP | 1125357 | 8/2001 | ............ H02N/1/00 |
|---|---|---|---|
| JP | 9163761 | 6/1997 | ............ H02N/1/00 |
| JP | 01264650 | 9/2001 | ............ G20B/26/08 |

* cited by examiner

Primary Examiner—Karl Eizo Tamai
(74) Attorney, Agent, or Firm—David N. Lathrop, Esq.; Gallagher & Lathrop

(57) ABSTRACT

A micromachined moving device which has a fixed electrode base plate 8 and a moving electrode plate 2 supported by a support frame 10 through anchor parts 23 and flexures 21 and held at a predetermined distance from the fixed electrode base plate 8, in which an AC drive voltage from an AC drive circuit 60 is applied across the fixed electrode base plate 8 and the moving electrode plate 2 so to drive by the electrostatic force into contact with the former and hold them in contact.

8 Claims, 8 Drawing Sheets

FIG. 3A
SINUSOIDAL WAVE

FIG. 3B
RECTANGULAR WAVE

FIG. 3C
TRIANGULAR WAVE

FIG. 4A
SINUSOIDAL TO
SINUSOIDAL

FIG. 4B
RECTANGULAR TO
SINUSOIDAL

MICROMACHINED MOVING DEVICE CONTROLLED BY A VARYING— AMPLITUDE AC DRIVE SIGNAL

BACKGROUND OF THE INVENTION

The present invention relates to a micromachined moving device wherein a voltage of periodically varying polarity is applied across a fixed electrode plate and a moving electrode plate to drive the latter and, more particularly, to a micromachined moving device adapted to prevent the moving electrode plate from sticking to the fixed electrode plate.

PRIOR ART

Figure 1A:
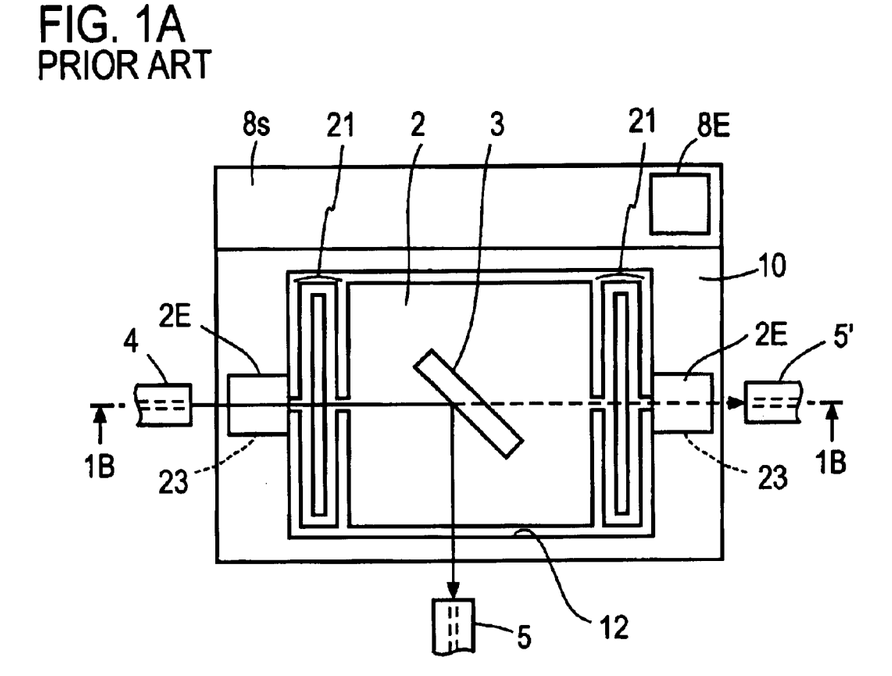
FIG. 1A is a plan view of a conventional micromachined moving device shown as applied to an optical switch.

Referring to FIGS. 1A and B, a conventional micromachined moving device will be described as being applied to an optical switch. FIG. 1A is a plan view of the micromachined moving device and FIG. 1B a sectional view taken along the line 1B—1B in FIG. 1A.

Figure 1B:
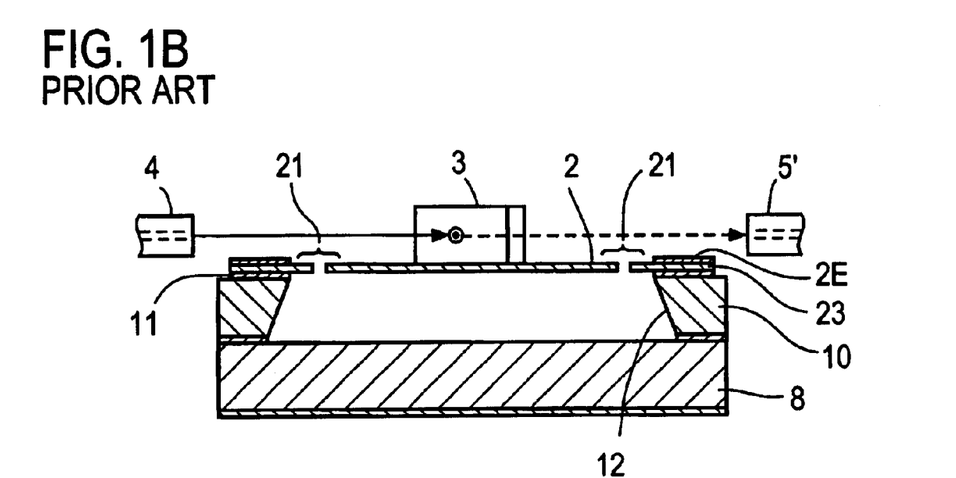
FIG. 1B is a sectional view taken on the line 1B—1B in FIG. 1A.

Reference numeral 10 denotes a support frame, 23 anchor parts, 21 flexures, 2 a moving electrode plate, 8 a base plate serving also as a fixed electrode (hereinafter referred to as a fixed electrode base plate), 2E moving electrode terminals, and 8E a fixed electrode terminal. The moving electrode plate 2 functions as a moving electrode and is coupled to the support frame 10 through the flexures 21 and the anchor parts 23. The flexures 21, which serve as hinges, are frame-shaped and resiliently support the moving electrode plate 2 in a manner to be vertically displaceable. The support frame 10 formed by a rectangular plate of single-crystal silicon (Si) is deposited all over its surface with an insulating layer of silicon oxide (SiO), which is covered with the moving electrode plate 2 having the anchor parts 23 and the flexures 21. The silicon single-crystal plate forming the support frame 2 has bored therethrough a countersink 12. That is, the silicon single-crystal plate is worked into such a support frame 10 as depicted in FIGS. 1A and 1B, on which the right- and left-hand anchor parts 23 and flexures 21 and the centrally-disposed moving electrode plate 2 are formed of a conductive silicon single-crystal material. On at least one of the right- and left-hand anchor parts 23, in this example, on both of them, there are formed the moving electrode terminals made of metal. The moving electrode plate 2 and the right- and left-hand flexures 21 are located inside the countersink 12. Mounted on the top of the moving electrode plate 2 is a mirror 3.

The fixed electrode base plate 8 is formed by a rectangular conductive silicon single-crystal plate, which has its one marginal portion projected beyond the support frame 10; on the top of the projected portion 8s there is formed the fixed electrode terminal 8E made of metal. A drive voltage is applied across the moving electrode terminals 2E and the fixed electrode terminal 8E from a DC drive circuit (not shown) to generate electrostatic force between the moving electrode plate 2 and the fixed electrode base plate 8, thereby attracting the former to the latter and hence driving the micromachined moving device. Such a micromachined moving device as shown in FIGS. 1A and 1B is manufactured by micro-machining technology including thin-film forming and etching techniques.

A brief description will be given below of switching operations by the optical switch described above. Reference numeral 4 denotes an emittance-side optical fiber or optical waveguide, and 5 and 5' incidence-side optical fibers or optical waveguides. FIGS. 1A and 1B depict a steady state in which light sent over the emittance-side optical fiber 4 is emitted from its end face, propagates through space and is reflected off the mirror 3 so that it is launched into the incidence-side optical fiber 5 for transmission therethrough. Upon voltage application across the both electrodes 2 and 8 to generate therebetween the electrostatic force pulling them together, the moving electrode plate 2 is driven downward, while at the same time the flexures 21 are resiliently deformed accordingly, permitting downward displacement of the electrode plate 2. As the moving electrode plate 2 is displaced, the mirror 3 mounted on the top of the electrode plate 2 also moves down and out of the optical path of the light emitted from the end face of the emittance-side optical fiber 4. As a result, the light intercepted by the mirror 3 so far travels in a straight line and enters the incidence-side optical fiber 5', over which it is transmitted. No light is reflected to the incidence-side optical fiber 5. As described above, the optical path can be switched spatially between the incidence-side optical fibers 5 and 5' without using an optical waveguide.

In the above optical switch, the moving electrode plate 2 is very thin and the flexures 21 connecting the moving electrode plate 2 to the anchor parts 23 are also very thin and small in elastic restoring force. Besides, the underside surface of the moving electrode plate 2 is smooth and the top surface of the fixed electrode base plate 8 opposite thereto is also smooth, so that when the both electrode plates have face-to-face contact with each other, the area of contact is wide. Accordingly, there occasionally arises a situation where when the underside surface of the moving electrode plate 2 is in close contact with the top surface of the fixed electrode base plate 8, the both electrode plates stick to each other under the action of the atmospheric pressure, Van der Waals forces or the like and do not immediately disengage in response to turning OFF of the drive voltage, resulting in no smooth switching operation. That is, a phenomenon may sometimes occur in which the moving electrode plate 2 would stick to the fixed electrode base plate 8 and would not instantaneously return to its initial position even when the voltage applied across them is removed. Furthermore, the contact between the moving electrode plate 2 and the fixed electrode base plate 8 causes conduction therebetween and induces a chemical reaction by arcs, which is considered to be a cause of the electrode sticking phenomenon; hence the direct contact between the moving electrode plate 2 and the fixed electrode base plate 8 is undesirable.

For example, in Japanese Patent Application Laid-Open Gazette No.2001-264650, there is disclosed a conventional optical switch in which minute projections are formed in at least one of the opposing surfaces of the electrode plates 2 and 8 to decrease their contact area and hence reduce their mutual sticking force. However, such a structural improvement still suffers the problem of conduction between the electrodes when they are in contact with each other.

Even if such inter-electrode conduction is prevented, for example, by covering the entire surface area of the fixed electrode base plate 8 with an insulating layer as of silicon oxide, the insulating layer becomes charged during the voltage application, and under action of electrostatic forces resulting from the charge, the moving electrode plate 2 sticks to the fixed electrode base plate 8 and does not instantaneously return to its initial position at the instant of cutting off the voltage, causing a time lag in the device operation. This problem by charging of the insulating layer could be reduced by forming minute projections of an insulating material on the surface of the fixed electrode base plate 8 for contact with the moving electrode plate 2, instead of forming the insulating layer all over the surface of the fixed electrode base plate 8. With this structure, however, it is impossible to exclude all the influences of charging.

SUMMARY OF THE INVENTION

It is an object of the present invention to provide a micromachined moving device capable of preventing the moving electrode plate from sticking to the fixed electrode plate.

The micromachined moving device according to the present invention comprises:

fixed electrode means;

moving electrode means disposed opposite at a distance from said fixed electrode means, said moving electrode means being resiliently supported; and an AC drive circuit connected to said fixed electrode means and said moving electrode means, for generating an AC drive voltage for application across said fixed electrode means and said moving electrode means in response to an input control signal;

wherein said AC drive circuit responds to said input control signal to apply said AC drive voltage across said fixed electrode means and said moving electrode means to drive said moving electrode means by electrostatic force into and out of contact with said fixed electrode plate.

With the above constitution of the present invention, it is possible to prevent the moving electrode plate from sticking to the fixed electrode plate without the need for introducing any particular complexities in their configurations.

DETAILED DESCRIPTION OF THE PREFERRED EMBODIMENTS

Figure 2A:
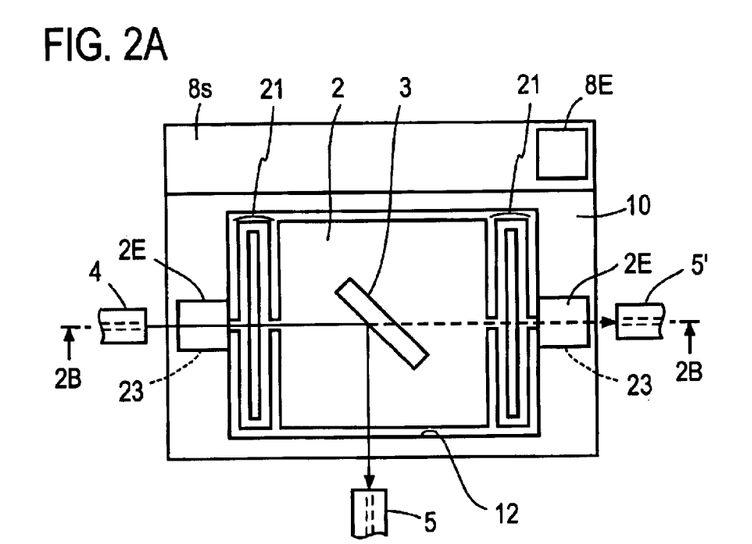
FIG. 2A is a plan view of the micromachined moving device according to the present invention.
Figure 2B:
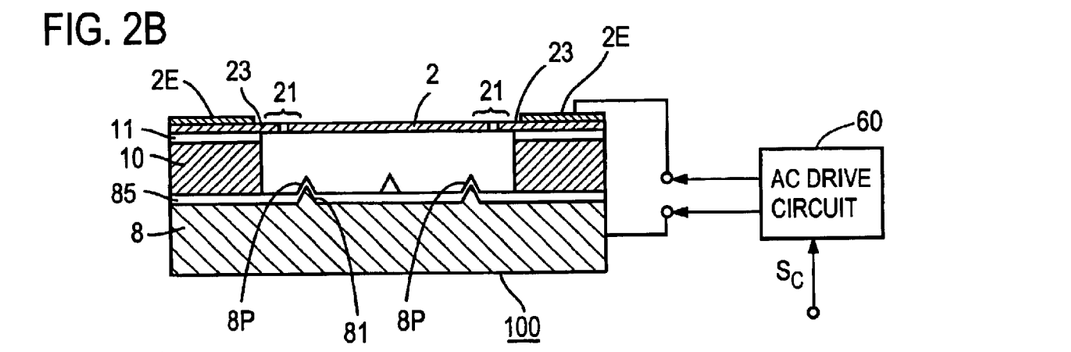
FIG. 2B is a sectional view taken on the line 2B—2B in FIGS. 2A and 2C.
Figure 2C:
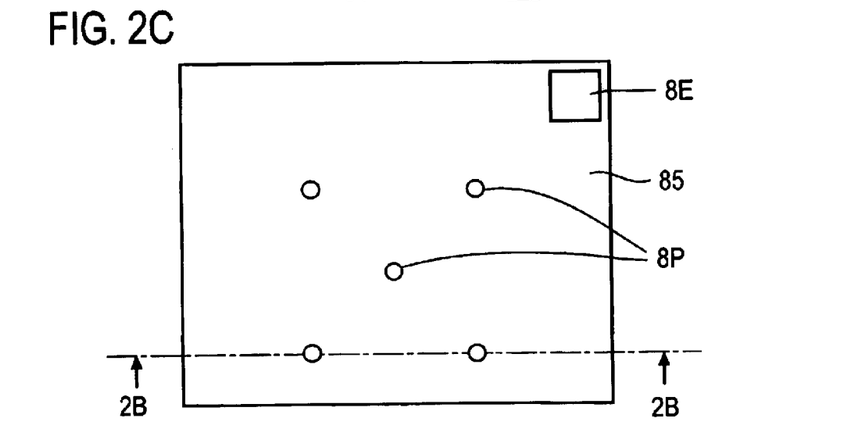
FIG. 2C is a plan view of a fixed electrode plate of the micromachined moving device shown in FIG. 2B.

Referring first to FIGS. 2A, 2B and 2C, an embodiment of the present invention will be described below, in which the parts corresponding to those in FIGS. 1A and 1B are identified by the same reference numerals. That is, reference numeral 10 denotes a support frame, 23 anchor parts, 21 flexures, 2 a moving electrode plate, 8p minute projections, and 8 a fixed electrode base plate. Furthermore, in the illustrated embodiment the top surface of the fixed electrode base plate 8 is covered with an insulating film 85 formed by a silicon oxide film.

FIG. 2A is a plan view of the micromachined moving device of this embodiment, FIG. 2B is its sectional view and FIG. 2C is a plan view of the fixed electrode base plate 8 covered with the insulating film 85. In FIG. 2B the support frame 10 and the moving electrode plate 2 are shown in section along the line 2B—2B in FIG. 2A, while the fixed electrode base plate 8 is shown in section along the line 2B—2B in FIG. 2C.

In this embodiment, the fixed electrode base plate 8 functions as a fixed electrode and in its top surface area facing toward the moving electrode plate 2 there are formed by anisotropic etching at least four projections, in this example, five projections 81, one at the center of the surface area and four around it. The fixed electrode base plate 8 is coated over the entire area of its surface with the insulating film 85 of silicon dioxide. The projections 81 are covered with the insulating film 85 to form minute projections 8p. The fixed electrode terminal 8E is formed directly in an exposed surface area of the fixed electrode plate 8 at a predetermined position after selectively etching away the insulating film 85 covering the fixed electrode base plate 8. The frame 10 is mounted on the fixed electrode base plate 8 covered with the insulating film 85, and on the top of the frame 10 coated with an insulating film 11 there are formed the anchor parts 23 of the moving electrode plate 2. The moving electrode plate 2 is supported by the anchor parts 23 through the flexures 21. Thus, the moving electrode plate 2 is held by the support frame 10 at a predetermined distance from the fixed electrode base plate 8. Except the above, this embodiment is identical in construction with the prior art example shown in FIGS. 1 and 2

Such a micromachined moving device is produced on a semiconductor silicon substrate through step-by-step applications of micromachining technologies including thin-film forming and etching techniques. The whole moving mechanism including the fixed electrode base plate 8 and the moving electrode 2, denoted generally by 100, will hereinafter be referred to as a micromachined moving element. The present invention further uses an AC drive circuit 60 (FIG. 2B), from which an AC drive voltage is applied across the moving electrode 2E (see FIG. 2A) and the fixed electrode terminal 8E of the micromachined element 100. In FIG. 2B the AC drive circuit 60 is shown to be connected directly to the fixed electrode base plate 8 since the fixed electrode terminal 8E is not seen. In the following description a combination of the micromachined moving element 100 and the AC drive circuit 60 will be referred to as the micromachined moving device according to the present invention.

As described above, according to the present invention, the fixed electrode base plate 8 and the anchor parts 23 are used as electrodes and a voltage of periodically varying polarity is applied from the AC drive circuit 60 across the fixed electrode base plate 8 and the moving electrode plate 2 to drive the latter. The AC drive circuit 60 responds to a control signal $S_C$ to switch between a first state ST1 in which to apply a voltage across the fixed electrode base plate 8 and the moving electrode plate 2 to drive and hold the latter by electrostatic force in contact with the former and a second state ST2 in which to apply no voltage across the moving electrode base plate 8 and the moving electrode plate 2 to keep them equipotential to hold the latter out of contact with the latter by the restoring force of the flexures 21.

The AC drive circuit 60 generates an AC drive signal $S_D$ in response to the control signal $S_C$ that is provided from the outside. The waveform of the drive signal SD may be, for example, a sinusoidal voltage waveform shown in FIG. 3A, a rectangular voltage waveform in FIG. 3B, or a triangular voltage waveform in FIG. 3C. In the second state ST2 the applied voltage is turned OFF.

Figure 3A:
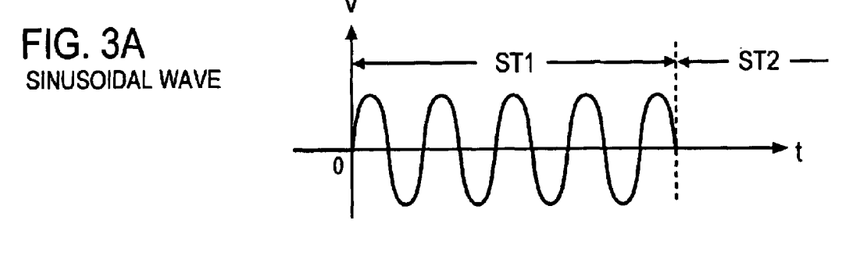
FIG. 3A is a graph showing a sinusoidal drive voltage waveform.
Figure 3B:
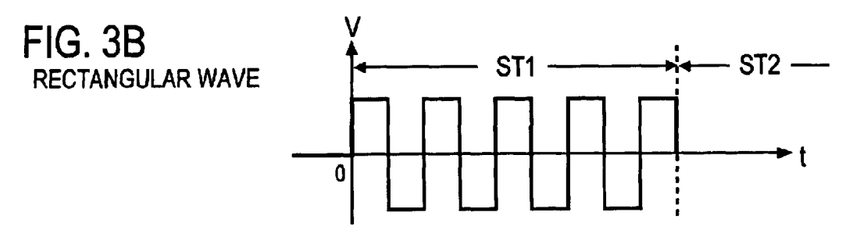
FIG. 3B is a graph showing a rectangular drive voltage waveform.
Figure 3C:
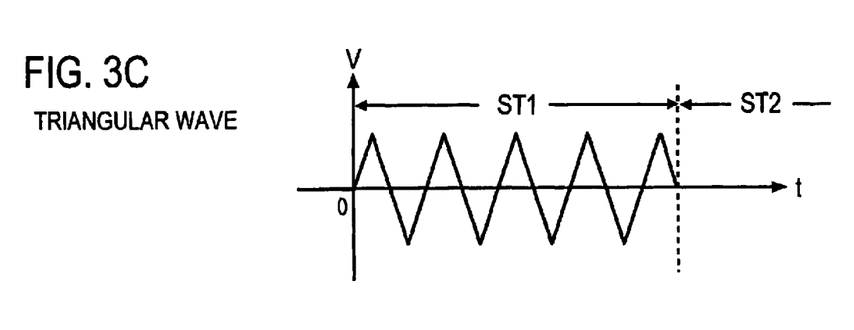
FIG. 3C is a graph sowing a triangular drive voltage waveform.

In the prior art a DC voltage of no polarity variation is applied across the fixed electrode base plate 8 and the moving electrode plate 2. On this account, ions in the atmosphere adhere to the interface between the moving electrode plate 2 and the fixed electrode base plate 8 and become charged; the charged ions still remaining after turning OFF the DC drive voltage are considered to be a cause of sticking of the moving electrode plate 2 to the fixed electrode base plate 8. According to the present invention, since an AC voltage of periodically varying polarity, such as shown in FIG. 3A, 3B or 3C, is used to drive the moving electrode plate 2 to thereby prevent ions in the atmosphere from adhering to the interface between the moving electrode 2 and the fixed electrode base plate 8, it is possible to exclude the possibility of the moving electrode plate 2 from sticking to the fixed electrode base plate 8.

As referred to above, the AC voltage application can also bring about the state ST1 in which the moving electrode plate 2 is sufficiently driven and held by the electrostatic force in contact with the fixed electrode base plate 8. In the present invention which adopts the AC voltage application the amount of charged ions in the insulating layer 85 between the fixed electrode base plate 8 and the moving electrode plate 2 is smaller than in the prior art example which uses the DC voltage of only one polarity—this reduces the time lag in the moving electrode plate 2 returning to its initial position caused by the charged ions.

Figure 4A:
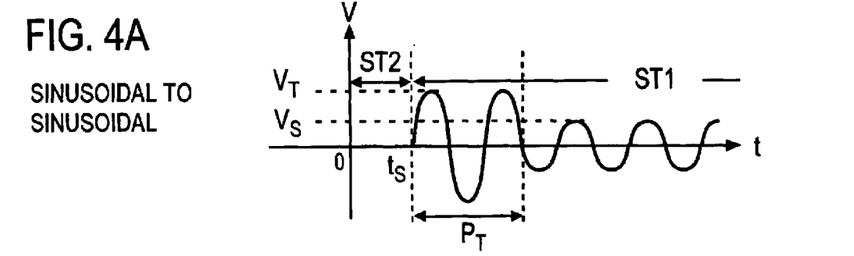
FIG. 4A is a graph showing another example of the drive voltage waveform.
Figure 4B:
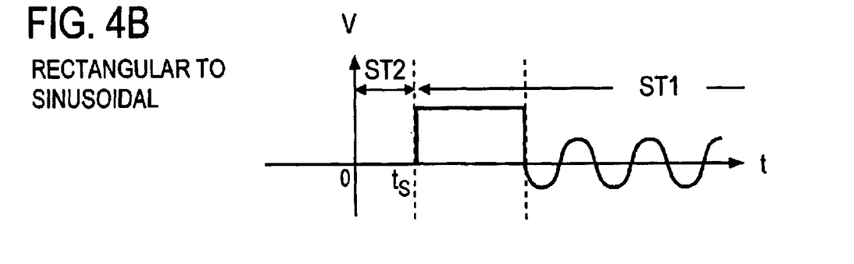
FIG. 4B is a graph showing still another example of the drive voltage waveform.

The AC drive voltage waveform may be such as depicted in FIG. 4A. The voltage of periodically varying polarity, which is applied across the fixed electrode base plate 8 and the moving electrode plate 2, is raised to $V_T$ high enough for the fixed electrode base plate 8 to attract thereto the moving electrode plate 2 only during the period $P_T$ of transition of the micromachined moving device from the second state ST2 to the first state ST1 immediately after the start of voltage application at time $T_S$, and after the transition the voltage is lowered to $V_S$ below $V_T$ although the moving electrode plate 2 can be held in contact with the fixed electrode base plate 8. Alternatively, the voltage during the transition period $P_T$ in FIG. 4A may be a DC voltage waveform with no polarity variations as shown in FIG. 4B. In this case, the switching speed of the movable electrode plate 2 can be increased higher than in the case of FIG. 4A.

Figure 5A:
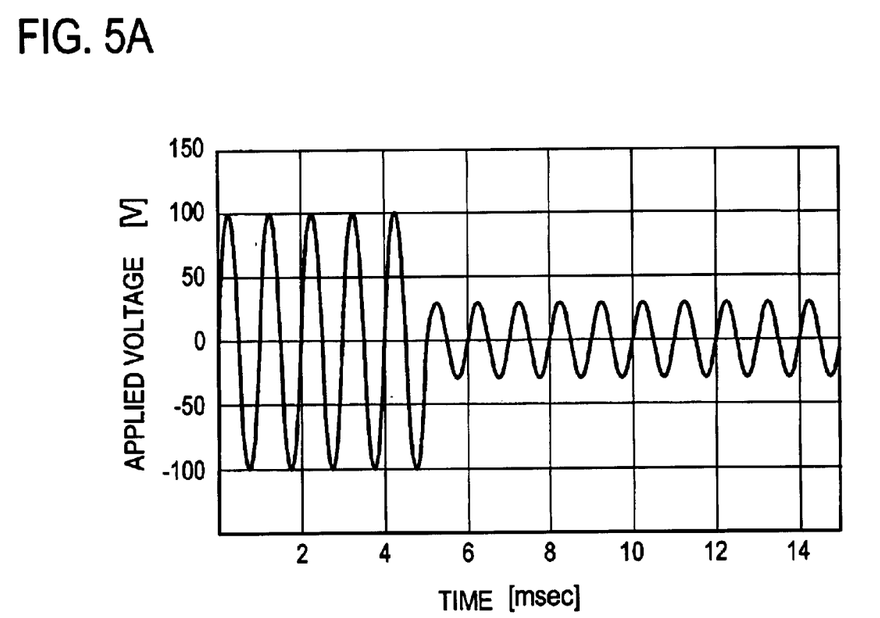
FIG. 5A is a graph showing a drive voltage waveform used for simulating operations of a micromachined moving device of a particular configuration and dimensions.
Figure 5B:
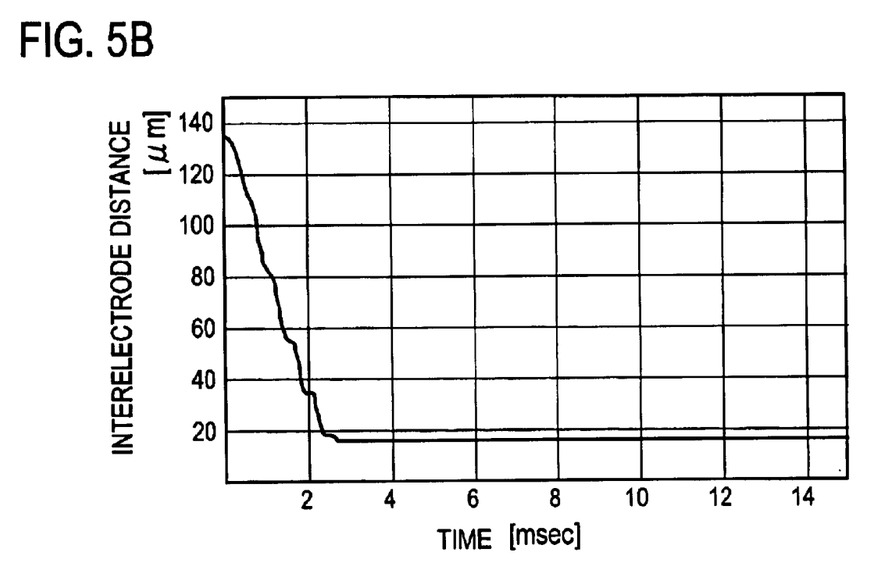
FIG. 5B is a graph showing variations in the distance between the moving electrode plate and the fixed electrode base plate, obtained by simulations using the drive voltage waveform shown in FIG. 5A.

FIGS. 5A and 5B show simulation results on variations in the voltage waveform and in the distance from the moving electrode plate 2 to the fixed electrode base plate 8, respectively, in the case of applying the sinusoidal voltage of FIG. 4A across the electrode plate base plate 8 and the moving electrode plate 2 of particular configurations and sizes of the micromachined moving element 100. The frequency of the drive voltage waveform is 1 kHz, and the voltage is 100 V during the transition period $P_T$ of a 5 msec duration and 30V in the subsequent period during which the moving electrode plate 2 is held in contact with the fixed electrode base plate 8. In the case of the above micromachined moving device, at least 80 V or so is needed to bring the moving electrode plate 2 into contact with the fixed electrode base plate 8 immediately after the start of voltage application in the second state ST2, but in the case of FIG. 5A a higher voltage 200 V is applied with a view to raising the switching speed such that the transition period $P_T$ becomes 5 msec or below. After the switching operation 30 V or so suffices for holding the moving electrode plate 2 in contact with the fixed electrode base plate 8. By keeping this voltage lower than that for switching, it is possible to cut the power consumption of the micromachined moving device.

The moving electrode plate 2 and the fixed electrode base plate 8 disposed opposite in the micromachined moving device according to the present invention can be regarded equivalently as forming a series connection of a capacitor and a resistor with respect to the AC drive circuit 60; as the frequency of drive voltage increases, the voltage applied to the capacitor decreases, reducing the electrostatic force between the electrodes. Accordingly, when the frequency of the drive voltage is higher than a certain value, it is impossible to attract the moving electrode plate 2 from its initial position (in the second state ST2) to the fixed electrode base plate 8 or to hold the former in contact with the latter (in the first state ST1). The threshold value of the frequency differs, depending on whether the voltage is applied for switching or for keeping the contact between the electrode plates 2 and 8; further, since threshold value of voltage frequency differs with the gap between the electrode plates 2 and 8, the configurations, sizes, elastic constants and electrical resistances of the electrode plates 2 and 8 and the flexures 21, the threshold value cannot be determined unconditionally. In general, however, the frequency is required to be lower than 100 kHz, and in practice, the frequency may preferably be several kHz or below. When the required switching speed is, for example, 5 msec or less, it is preferable that the drive voltage be 200 Hz or above.

Figure 6A:
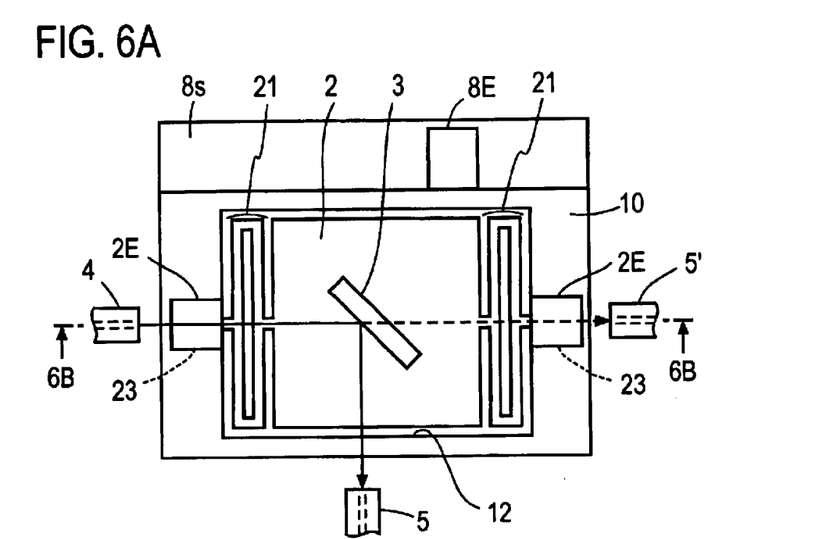
FIG. 6A is a plan view of another embodiment of the micromachined moving device according to the present invention.
Figure 6B:
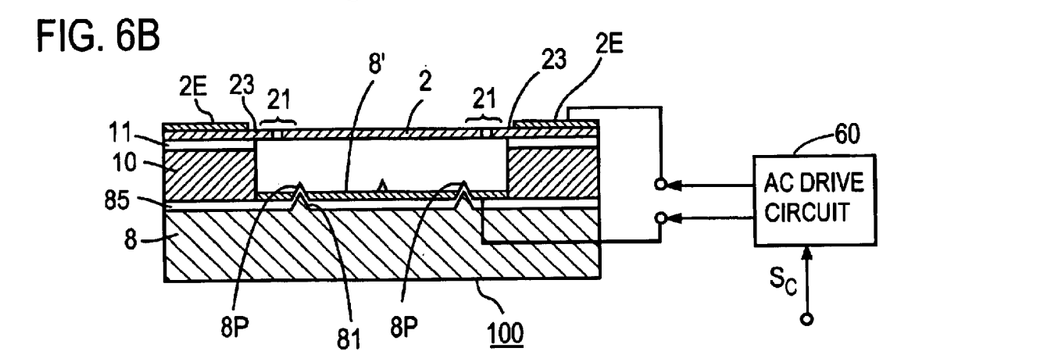
FIG. 6B is a sectional view taken on the line 6B—6B in FIGS. 6A and 6C.
Figure 6C:
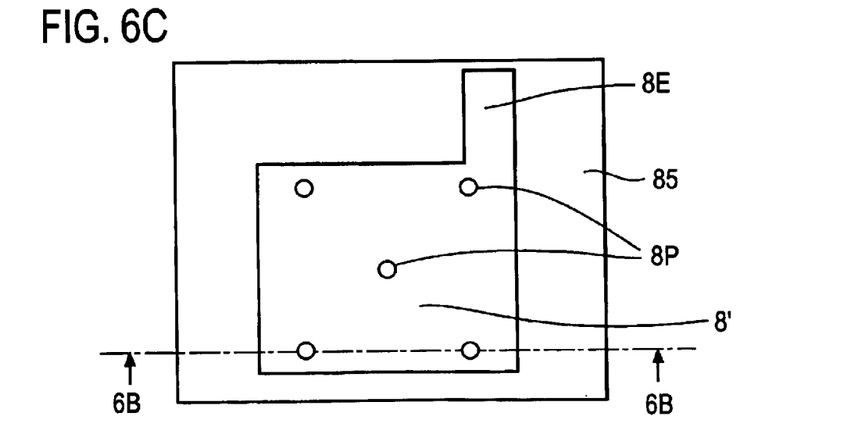
FIG. 6C is a plan view of the fixed electrode base plate of the micromachined moving device shown in FIG. 6B.

FIGS. 6A, 6B and 6C illustrate a modified form of the embodiment depicted in FIGS. 2A, 2B and 2C. In the FIG. 2 embodiment the fixed electrode base plate 8 also supports the entire structure of the micromachined moving element 100, but in this modification a fixed electrode 8' is formed by a film of metal coated over the top surface of the insulating film 85 covering the surface of the fixed electrode base plate 8 except the minute projections 8p as shown in FIG. 6C, the fixed electrode 8' being contiguous to the fixed electrode terminal 8E. The minute projections 8p protrude upwardly of the fixed electrode 8' for contact with the moving electrode plate 2 when the latter is displaced downward. This embodiment is identical in construction with the FIG. 2 embodiment except the above. The drive voltage from the AC drive circuit 60 is applied across the fixed electrode terminal 8E formed integrally with the fixed electrode 8' and the moving electrode plate 2. The use of a metal electrode as the fixed electrode 8' reduces the electrical resistance and hence increases the response speed and suppresses loss.

Figure 7:
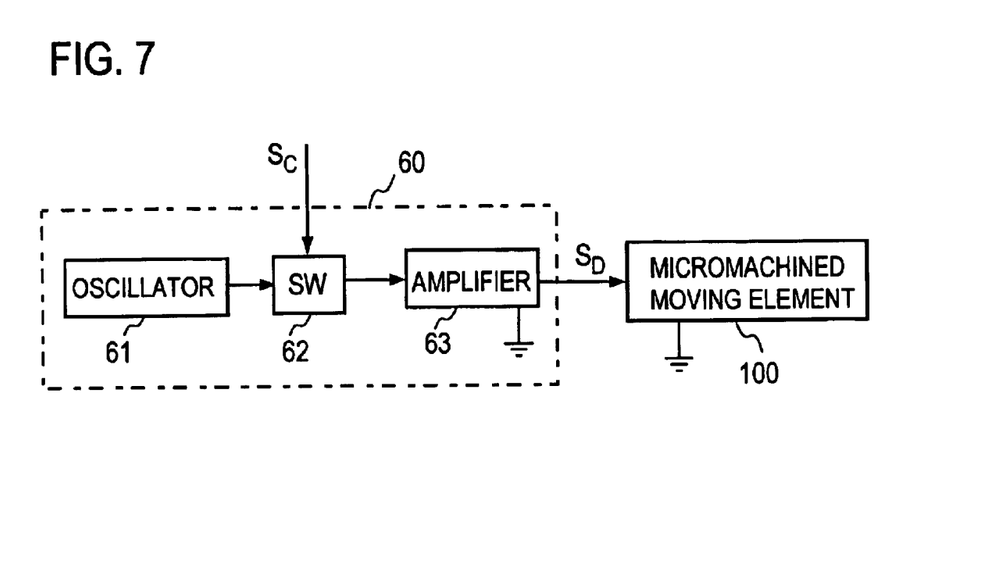
FIG. 7 is a block diagram depicting an example of an AC drive circuit for generating the drive voltage waveform of FIG. 3A, 3B or 3C.

FIG. 7 illustrates an example of the AC drive circuit 60 which generates the simple AC waveform voltages of FIGS. 3A, 3B and 3C for application to the micromachined moving elements 100 of the embodiments shown in FIGS. 2A, 2B, 2C and 6A, 6B, 6C. An oscillator 61 generates a signal of a sinusoidal wave (FIG. 3A), rectangular wave (FIG. 3B) or triangular wave (FIG. 3C), which is provided via a switch 62 to an amplifier 63. The amplifier 63 amplifies the input signal up to a predetermined voltage, and applies the amplified signal as a drive signal $S_D$ to the micromachined moving element 100. The switch 62 is turned ON/OFF under control of an external control signal $S_C$, by which the drive signal $S_D$ to be applied to the micromachined moving element 100 is turned ON and OFF accordingly.

Figure 8:
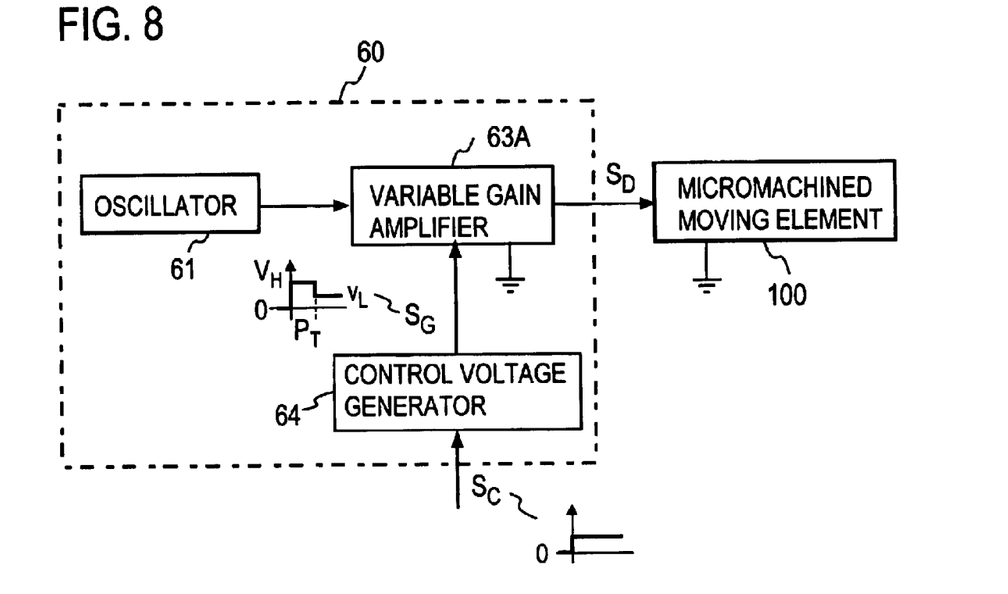
FIG. 8 is a block diagram depicting an example of an AC drive circuit for generating the drive voltage waveform of FIG. 4A.

FIG. 8 illustrates an example of the AC drive circuit 60 which generates the drive voltage waveform depicted in FIG. 4A. In this example a control voltage generator 64 responds to the input control signal $S_C$ to generate a gain control signal $S_G$, which is applied to a variable gain amplifier 63A to control its gain. The gain control signal $S_G$ is a signal that is held at a predetermined first voltage $V_H$ only during a predetermined period $P_T$ and thereafter held at a second voltage $V_L$ lower than the first one $V_H$ until the input control signal $S_C$ is turned OFF. The variable gain amplifier 63A amplifies an AC signal from the oscillator 61 with the gain specified by the gain control signal $S_G$, and applies the drive signal $S_D$ to the micromachined moving element 100. In this example, when the voltage of the gain control signal $S_G$ is equal to the first voltage $V_H$ as shown in FIG. 4A, the variable gain amplifier 63A amplifies the input AC signal up to a predetermined voltage $V_T$ at which the moving electrode plate 2 and the fixed electrode base plate 8 attract to each other within a predetermined period of time, whereas when the gain control signal $S_G$ is at the second voltage VL, the variable gain amplifier 63A amplifies the input AC signal to a voltage $V_S$ which is lower than the voltage $V_T$ but high enough to hold the electrode plates 2 and 8 in contact with each other. When the gain control signal SC is at 0 V, the output from the gain amplifier 63A is 0 V. In FIG. 8 the oscillator 61 may generate a rectangular or triangular wave instead of generating the sinusoidal wave. The same goes for the examples of the AC drive circuit described below.

Figure 9:
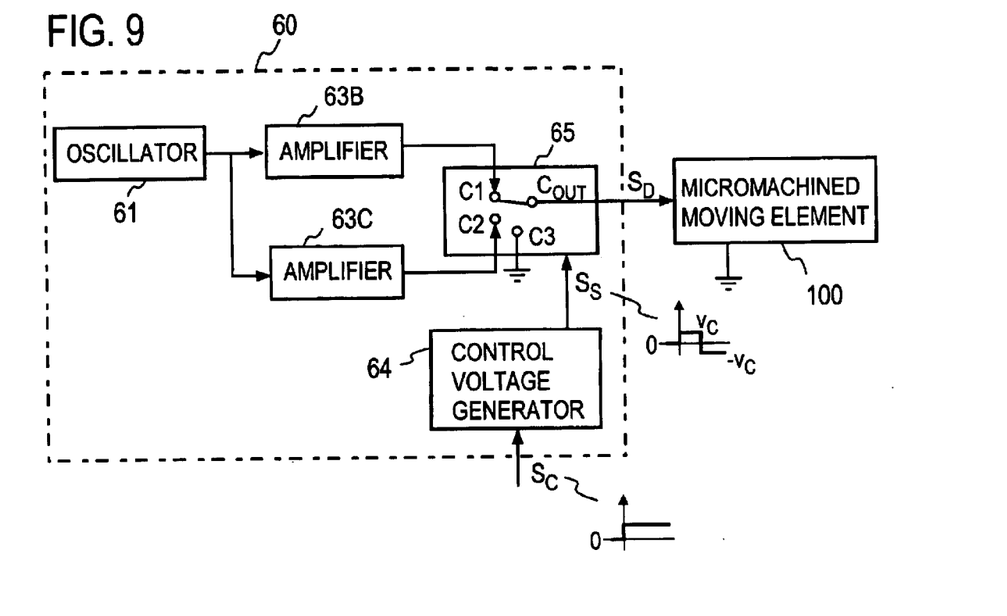
FIG. 9 is a block diagram depicting another example of the AC drive circuit for generating the drive voltage waveform of FIG. 4A.

FIG. 9 illustrates another embodiment of the AC drive circuit 60 which generates the drive voltage waveform of FIG. 4A. In this example the afore-mentioned two gains, which are set in the variable gain amplifier 63 in FIG. 8, are set in separate amplifiers 63B and 63C, and the output from the oscillator 61 is provided to the two amplifiers 63B and 63C. The outputs from the amplifiers 63B and 63C are fed to two terminals C1 and C2 of a selector 65. The control voltage generator 64 responds to the input control signal $S_C$ to output a select signal $S_S$ of voltage $V_C$ during the period $P_T$, after which the select signal $S_S$ goes down to a voltage $-V_C$, and when the control signal $S_C$ becomes 0V, the select signal $S_S$ also goes down to 0 V. While supplied with the voltage $V_C$, the selector 65 connects the terminal C1 to an output terminal $C_{OUT}$ to provide therethrough the output voltage from the amplifier 63B to the micromachined moving element 100; when the select signal $S_S$ goes down to the voltage $-V_C$, the selector 65 connects the terminal C2 to the output terminal $C_{OUT}$ to provide therethrough the output voltage from the amplifier 63C to the micromachined moving element 100. On the voltage of the select signal $S_S$ becoming 0 V, the selector 65 connects a grounding terminal C3 to the output terminal $C_{OUT}$. The selector 65 may also be provided at a stage preceding the amplifiers 63B and 63C.

Figure 10:
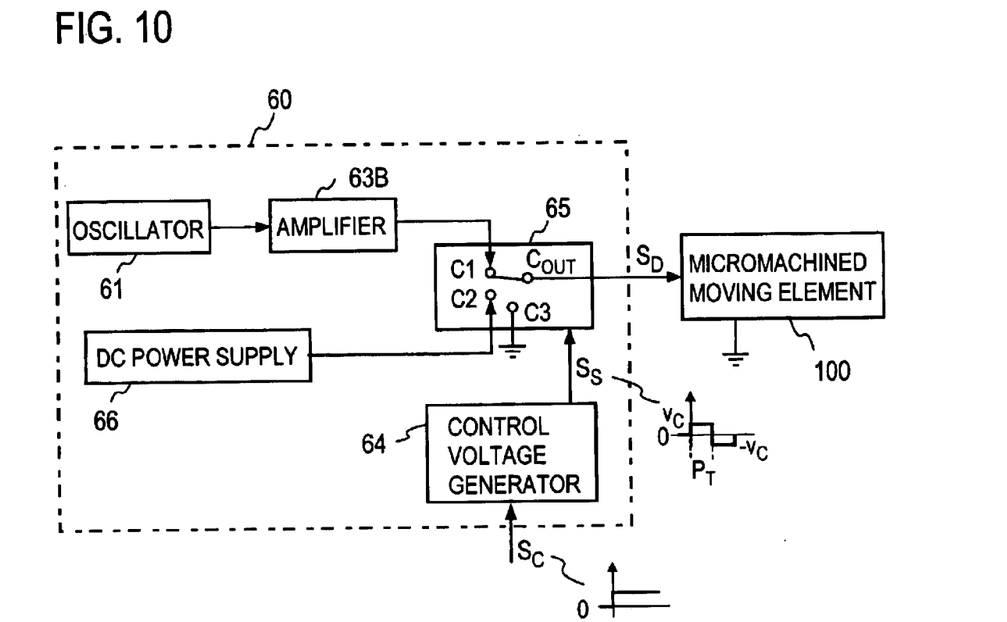
FIG. 10 is a block diagram depicting an example of the AC drive circuit for generating the drive voltage waveform of FIG. 4B.

FIG. 10 illustrates an embodiment of the AC drive circuit 60 which generates the drive voltage waveform shown in FIG. 4B. In this embodiment the amplifier 63C in the FIG. 9embodiment is substituted with a DC power supply 66 which outputs a predetermined DC voltage. The output from the oscillator 61 which generates an AC signal is applied via the amplifier 63 to the terminal C1 of the selector 65, and the DC voltage from the DC power supply 66 is provided to the terminal C2 of the selector 65, which has its terminal C3 grounded. The operation of the selector 65 by the select signal $S_S$ is the same as in the FIG. 9 embodiment, and no description will be repeated.

Figure 11:
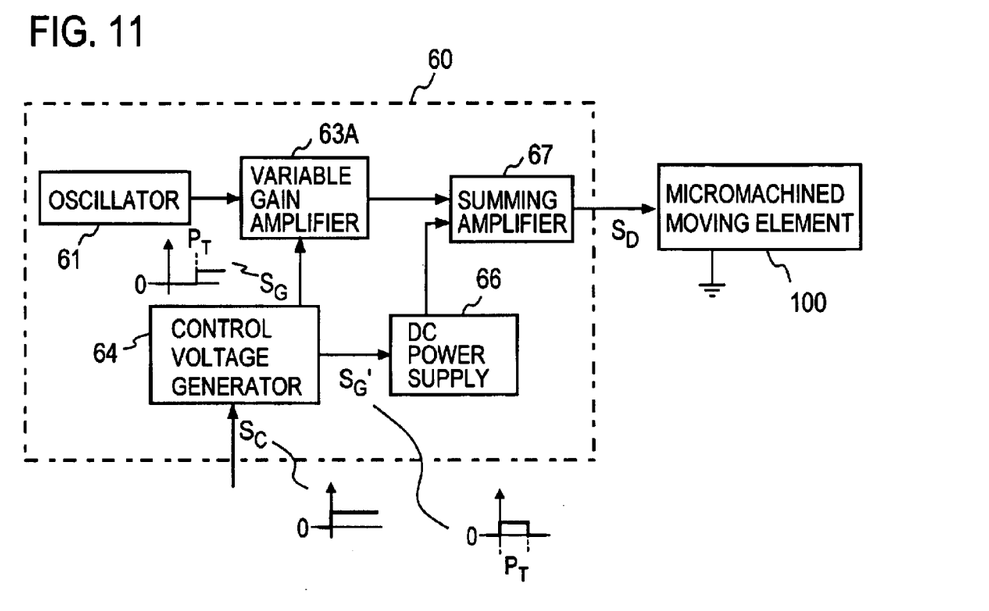
FIG. 11 is a block diagram depicting another example of the AC drive circuit for generating the drive voltage waveform of FIG. 4B.

FIG. 11 illustrates another embodiment of the AC drive circuit 60 which generates the drive voltage waveform of FIG. 4B. In this embodiment the output from the oscillator 61 is amplified by the variable gain amplifier 63A, whose output is provided to the micromachined moving element 100 after being added by a summing amplifier 68 with the output DC voltage from the DC power supply 66. The control voltage generator 64 responds to the input control signal $S_C$ to generate the gain control signal $S_G$ which remains at 0 V during the period $P_T$ and thereafter at the predetermined voltage $V_H$ until the control signal $S_C$ is turned OFF. The variable gain amplifier 63A outputs 0 V while the gain control signal $S_G$ is 0 V, and when the gain control signal SG goes high to the predetermined voltage $V_H$, the variable gain amplifier 63A outputs the drive signal $S_G$ of the voltage $V_S$ high enough to keep the moving electrode plate 2 in contact with the fixed electrode base plate 8. The control voltage generator 64 generates a voltage inverse in logic to the gain control signal $S_G$, that is, supplies the DC power supply 66 with a voltage control signal $S_G'$ which is low-level (0 V) when the gain control signal $S_G$ is at $V_H$ and high-level when the gain control signal $S_G$ is 0 V. The DC power supply 6 outputs 0 V when the voltage control signal $S_G'$ is low-level and the predetermined voltage VT when the voltage control signal $S_G'$ is high-level; the output from the DC power supply 66 is added by the summing amplifier 67 with the output from the variable gain amplifier 63A, thereafter being provided to the micromachined moving element 100.

Figure 12:
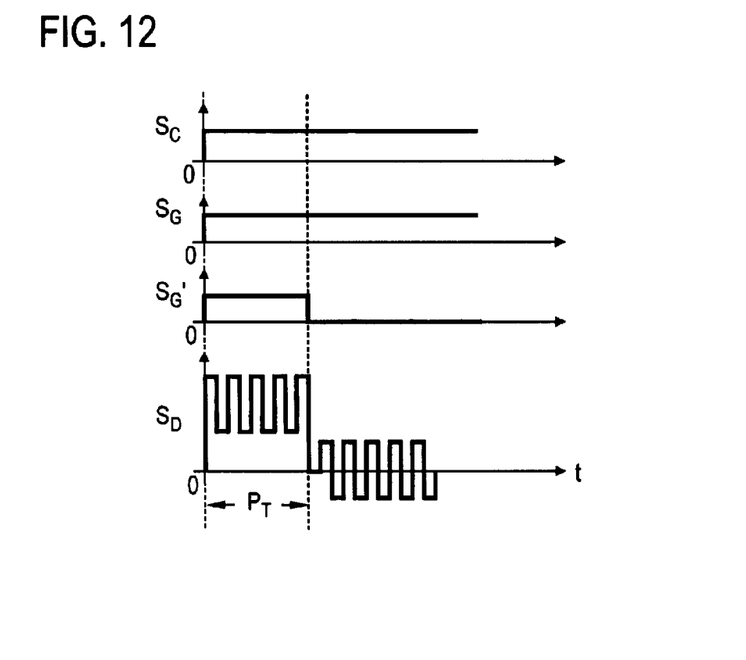
FIG. 12 is a waveform diagram showing respective signals by another example of operation of the AC drive circuit depicted in FIG. 11.

In the FIG. 11 embodiment, as shown in FIG. 12, when the gain control signal $S_G$ is set to rise at the same time as the input control signal $S_C$ rises, the drive signal $S_D$ during the period $P_T$ becomes an AC voltage waveform biased by the DC voltage from the DC power supply 66.

According to the principle of the present invention that can be seen from the above, the micromachined moving element 100 need not be limited specifically to those depicted in FIGS. 2A, 2B, 2C and FIGS. 6A, 6B, 6C but even in the cases of conventional micromachined moving elements of the type having the fixed and moving electrode plates, the same effect as described above could be produced by applying the AC drive circuit in combination with them.

That is, the basic configuration of the micromachined moving device according to the present invention comprises fixed electrode means, resiliently supported moving electrode means disposed in adjacent but spaced relation to the fixed electrode means, and an AC drive circuit for applying an AC drive voltage across the fixed and moving electrode means.

EFFECT OF THE INVENTION

As described above, according to the present invention, as long as the period of the AC voltage by the voltage source is set to a proper value taking into account the response speed of the moving electrode plate relative to the applied voltage in the micromachined moving device, there is no fear that zero crossing of the AC voltage decreases the electrostatic force and hence makes unstable the contact of the moving electrode plate with the fixed electrode base plate; that is, the use of AC voltage also brings about the first state in which the moving electrode plate is sufficiently driven by electrostatic force into and held in contact with the fixed electrode base plate. As compared with the prior art example in which the moving electrode plate is brought in and held in contact with the fixed electrode base plate by use of a voltage of only one polarity, the present invention, which drives the moving electrode by the AC voltage, decreases the amount of ions which become charged in the insulating film between the fixed electrode base plate and the moving electrode plate during voltage application—this reduces the time delay in the return of the moving electrode plate to its initial position which is attributable to the charged ions.

By setting, only during the period of transition from the first to the second state, the voltage of periodically varying polarity higher than the voltage for attracting the moving electrode plate to the fixed electrode base plate, it is possible to increase the moving electrode plate switching speed and to reduce the power consumption of the micromachined moving device.

What is claimed is:

1. A micromachined moving device comprising:

fixed electrode means;

moving electrode means disposed opposite at a distance from said fixed electrode means, said moving electrode means being resiliently supported; and an AC drive circuit connected to said fixed electrode means and said moving electrode means, for generating an AC drive voltage for application across said fixed electrode means and said moving electrode means in response to an input control signal;

wherein said AC drive circuit responds to said input control signal to apply said AC drive voltage across said fixed electrode means and said moving electrode means to drive said moving electrode means by electrostatic force into and out of contact with said fixed electrode plate; and wherein said AC drive circuit comprises:
an oscillator for generating an AC signal of periodically varying polarity as at least part of said AC drive voltage;
a variable gain amplifier for amplifying said AC signal from said oscillator and for outputting said AC drive voltage; and
a control voltage generator responsive to said input control signal to generate a gain control signal which controls the gain of said variable gain amplifier to amplify said AC signal to a first voltage for attracting said moving electrode means into contact with said fixed electrode means for a predetermined period and thereafter amplify said AC signal to a second voltage lower than said first voltage for holding said moving electrode means in contact with said fixed electrode means until said input control signal is turned OFF.

2. A micromachined moving device comprising:

fixed electrode means;

moving electrode means disposed opposite at a distance from said fixed electrode means, said moving electrode means being resiliently supported; and an AC drive circuit connected to said fixed electrode means and said moving electrode means, for generating an AC drive voltage for application across said fixed electrode means and said moving electrode means in response to an input control signal;

wherein said AC drive circuit responds to said input control signal to apply said AC drive voltage across said fixed electrode means and said moving electrode means to drive said moving electrode means by electrostatic force into and out of contact with said fixed electrode plate; and wherein said AC drive circuit comprises:
an oscillator for generating an AC signal of periodically varying polarity as at least part of said AC drive voltage;
a first amplifier for amplifying said AC signal from said oscillator to a first voltage for attracting said moving electrode means into contact with said fixed electrode means;
a second amplifier for amplifying said AC signal from said oscillator to a second voltage lower than said first voltage for holding said moving electrode means in contact with said fixed electrode means;
a selector for any one of the output from said first amplifier, the output from said second amplifier and the ground voltage and outputting the selected input as said AC drive voltage; and
a control voltage generator responsive to said input control signal to generate a select control signal for controlling said selector so that said selector selects the output from said first amplifier for a predetermined period and thereafter selects the output from said second amplifier and select said ground voltage when said input control signal is turned OFF.

3. A micromachined moving device comprising:

fixed electrode means;

moving electrode means disposed opposite at a distance from said fixed electrode means, said moving electrode means being resiliently supported; and an AC drive circuit connected to said fixed electrode means and said moving electrode means, for generating an AC drive voltage for application across said fixed electrode means and said moving electrode means in response to an input control signal;

wherein said AC drive circuit responds to said input control signal to apply said AC drive voltage across said fixed electrode means and said moving electrode means to drive said moving electrode means by electrostatic force into and out of contact with said fixed electrode plate; and wherein said AC drive circuit comprises:
an oscillator for generating an AC signal of periodically varying polarity as at least part of said AC drive voltage;

a DC power supply for outputting a first DC voltage for attracting said moving electrode means into contact with said fixed electrode means;

an amplifier for amplifying said AC signal from said oscillator to a second AC voltage lower than said first DC voltage for holding said moving electrode means in contact with said fixed electrode means;

a selector for selecting any one of the output from said DC power supply, the output from said amplifier and the ground voltage and outputting the selected input as said AC drive voltage; and a control voltage generator responsive to said input control signal o generate a select control signal for controlling said selector so that said selector selects the output from said DC power supply for a predetermined period, thereafter selects the output from said amplifier and selects said ground voltage when said input control signal is turned OFF.

4. A micromachined moving device comprising:

fixed electrode means;

moving electrode means disposed opposite at a distance from said fixed electrode means, said moving electrode means being resiliently supported; and an AC drive circuit connected to said fixed electrode means and said moving electrode means, for generating an AC drive voltage for application across said fixed electrode means and said moving electrode means in response to an input control signal;

wherein said AC drive circuit responds to said input control signal to apply said AC drive voltage across said fixed electrode means and said moving electrode means to drive said moving electrode means by electrostatic force into and out of contact with said fixed electrode plate; and wherein said AC drive circuit comprises:

an oscillator for generating an AC signal of periodically varying polarity as at least part of said AC drive voltage;

a DC power supply for outputting a DC voltage for attracting said moving electrode means into contact with said fixed electrode means;

a variable gain amplifier for amplifying said AS signal from said oscillator and outputting an AC voltage for holding said moving electrode means in contact with said fixed electrode means;

a summing amplifier for adding together the DC voltage from said DC power supply and the output voltage from said variable gain amplifier and outputting the added voltage as said AC drive voltage; and a control voltage generator responsive to said input control signal to generate a first control signal for driving said DC power supply to output said DC voltage for a predetermined period and a second voltage control signal for controlling the gain of said variable gain amplifier so that said variable gain amplifier outputs 0 V for said predetermined period and thereafter outputs an AC voltage for holding said moving electrode means in contact with said fixed electrode means.

5. A micromachined moving device comprising:

fixed electrode means;

moving electrode means disposed opposite at a distance from said fixed electrode means, said moving electrode means being resiliently supported; and an AC drive circuit connected to said fixed electrode means and said moving electrode means, for generating an AC drive voltage for application across said fixed electrode means and said moving electrode means in response to an input control signal;

wherein said AC drive circuit responds to said input control signal to apply said AC drive voltage across said fixed electrode means and said moving electrode means to drive said moving electrode means by electrostatic force into and out of contact with said fixed electrode plate; and wherein said AC drive circuit comprises:

an oscillator for generating an AC signal of periodically varying polarity as at least part of said AC drive voltage;

a DC power supply for outputting a DC voltage for attracting said moving electrode means into contact with said fixed electrode means;

a variable gain amplifier for amplifying said AS signal from said oscillator and outputting an AC voltage for holding said moving electrode means in contact with said fixed electrode means;

a summing amplifier for adding together the DC voltage from said DC power supply and the output voltage from said variable gain amplifier and outputting the added voltage as said AC drive voltage; and a control voltage generator responsive to said input control signal to generate a first control signal for driving said DC power supply to output said DC voltage for a predetermined period and a second voltage control signal for controlling the gain of said variable gain amplifier so that said variable gain amplifier outputs an AC voltage for holding said moving electrode means in contact with said fixed electrode means.

6. The device of any one of claims 1 through 5, wherein said fixed electrode means has on its top at least four minute projections formed opposite at a distance from said moving electrode means, and an insulating film formed all over the top surface of said fixed electrode means including said minute projections.

7. The device of any one of claims 1 through 5, wherein said fixed electrode means has a fixed base plate, an insulating film formed all over a top surface of said fixed base plate, and a fixed electrode formed on said insulating film opposite said moving electrode means.

8. The device of claim 7, wherein said fixed electrode means has on its top at least four minute projections covered with said insulating film and protruding upwardly of said fixed electrode.

* * * * *